(12) United States Patent
Tao et al.

(10) Patent No.: US 12,736,244 B2
(45) Date of Patent: Sep. 15, 2026

(54) CONTROL METHOD AND DEVICE OF MULTI-TUBE AIR CONDITIONER, AIR CONDITIONER AND STORAGE MEDIUM

(71) Applicants: WUHU MATY AIR-CONDITIONING EQUIPMENT CO., LTD., Wuhu (CN); GD MIDEA AIR-CONDITIONING EQUIPMENT CO., LTD., Foshan (CN)

(72) Inventors: Kui Tao, Wuhu (CN); Lei Chen, Wuhu (CN); Zhigang Huang, Wuhu (CN); Zhengxing Wang, Wuhu (CN); Hongyao Li, Wuhu (CN); Ji Liu, Wuhu (CN); Hehua Zhu, Wuhu (CN)

(73) Assignees: WUHU MATY AIR-CONDITIONING EQUIPMENT CO., LTD., Wuhu (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 491 days.

(21) Appl. No.: 18/288,861

(22) PCT Filed: Jun. 30, 2021

(86) PCT No.: PCT/CN2021/103491
§ 371 (c)(1),
(2) Date: Oct. 30, 2023

(87) PCT Pub. No.: WO2022/227267
PCT Pub. Date: Nov. 3, 2022

(65) Prior Publication Data

US 2024/0230134 A1 Jul. 11, 2024

(30) Foreign Application Priority Data

Apr. 30, 2021 (CN) ......................... 202110493993.0

(51) Int. Cl.
*F24F 11/61* (2018.01)
*F24F 11/00* (2018.01)
(Continued)

(52) U.S. Cl.
CPC .............. *F24F 11/61* (2018.01); *F24F 11/00* (2013.01); *F24F 11/30* (2018.01); *F24F 11/64* (2018.01);
(Continued)

(58) Field of Classification Search
CPC ............ F24F 11/30; F24F 11/00; F24F 11/64; F25B 41/31; F25B 49/02; F25B 2600/00;
(Continued)

(56) References Cited

U.S. PATENT DOCUMENTS 6,318,101 B1 * 11/2001 Pham ...................... F25B 41/34 62/225
7,784,296 B2 * 8/2010 Chen ...................... F25B 41/34 62/157
(Continued)

FOREIGN PATENT DOCUMENTS

CN 101276226 A 10/2008
CN 103196202 A 7/2013
(Continued)

OTHER PUBLICATIONS

The World Intellectual Property Organization (WIPO) International Search Report and Written Opinion for PCT/CN2021/103491 Jan. 26, 2022 17 pages (including English translation).
(Continued)

*Primary Examiner* — Ronald D Hartman, Jr.
(74) *Attorney, Agent, or Firm* — Anova Law Group, PLLC

(57) ABSTRACT

A control method of a multi-tube air conditioner includes acquiring an exhaust temperature of a compressor of the
(Continued)

multi-tube air conditioner and an evaporation temperature of a target indoor unit of the multi-tube air conditioner in response to detecting the multi-tube air conditioner being in a target operation state, determining a target opening of an electronic expansion valve of the target indoor unit according to the exhaust temperature and the evaporation temperature, acquiring a condensation temperature of the multi-tube air conditioner, determining a minimum limited opening of the electronic expansion valve according to the condensation temperature and the exhaust temperature, and adjusting an opening of the electronic expansion valve according to the target opening and the minimum limited opening.

16 Claims, 5 Drawing Sheets

(51) Int. Cl.

| | |
|---|---|
| ***F24F 11/30*** | (2018.01) |
| ***F24F 11/64*** | (2018.01) |
| ***F24F 11/84*** | (2018.01) |
| ***F25B 41/31*** | (2021.01) |
| ***G05B 19/00*** | (2006.01) |
| ***G05D 23/00*** | (2006.01) |

(52) U.S. Cl.
CPC ............... *F24F 11/84* (2018.01); *F25B 41/31* (2021.01); *G05B 19/00* (2013.01); *G05D 23/00* (2013.01)

(58) Field of Classification Search
CPC ........ G05D 23/00; G05B 13/00; G05B 15/00; G05B 19/00
USPC .......................................................... 700/276
See application file for complete search history.

(56) References Cited

U.S. PATENT DOCUMENTS

| | | | | |
|---|---|---|---|---|
| 8,899,058 | B2 * | 12/2014 | Unezaki | F25B 13/00 62/197 |
| 9,032,749 | B2 * | 5/2015 | Korenaga | F24F 3/065 62/222 |
| 9,341,398 | B2 * | 5/2016 | Liu | F25B 41/34 |
| 2003/0070441 | A1 * | 4/2003 | Moon | F04C 23/008 62/210 |
| 2008/0028779 | A1 * | 2/2008 | Song | F25B 41/347 62/190 |
| 2017/0198956 | A1 * | 7/2017 | Luo | F25B 13/00 |
| 2018/0031288 | A1 * | 2/2018 | Hern | F25B 41/35 |

FOREIGN PATENT DOCUMENTS

| | | | |
|---|---|---|---|
| CN | 103884140 | A | 6/2014 |
| CN | 104990294 | A | 10/2015 |
| CN | 107975920 | A | 5/2018 |
| CN | 109059369 | A | 12/2018 |
| CN | 110671781 | A | 1/2020 |
| CN | 111649461 | A | 9/2020 |
| CN | 112611041 | A | 4/2021 |
| JP | H0926184 | A | 1/1997 |
| KR | 101911272 | B1 | 12/2018 |
| WO | 2017221396 | A1 | 12/2017 |

OTHER PUBLICATIONS

The China National Intellectual Property Administration (CNIPA) The Notification to Grant Patent Right for invention for Chinese Application 202110493993.0 Oct. 16, 2023 6 Pages (With Translation).

* cited by examiner

CONTROL METHOD AND DEVICE OF MULTI-TUBE AIR CONDITIONER, AIR CONDITIONER AND STORAGE MEDIUM

CROSS-REFERENCE TO RELATED APPLICATIONS

This application is a National Stage Entry under 35 U.S.C. § 371 of International Application No. PCT/CN2021/103491, filed on Jun. 30, 2021, which claims priority to Chinese Patent application Ser. No. 202110493993.0, filed on Apr. 30, 2021, the entire contents of both of which are incorporated herein by reference.

TECHNICAL FIELD

The present application relates to the technical field of air conditioners, in particular to a control method and device of a multi-tube air conditioner, an air conditioner, and a storage medium.

BACKGROUND

At present, when a multi-tube air conditioner performs low-temperature refrigeration and the cooling capacity demand of the unit is greater than the current refrigeration output value, an opening of an electronic expansion valve of the multi-tube air conditioner will be reduced until the opening is decreased to the minimum.

However, the minimum limited opening of the target multi-tube multi-split air conditioner is a fixed opening value. When the minimum limited opening is unreasonably set, for example, if the minimum limited opening is too small, due to the high frequency of a compressor and the small opening, the refrigerant flow is not smooth, resulting in low pressure on the suction side, which in turn causes the system's low-pressure protection to trip and stop. When the opening is too large, an exhaust temperature is much lower than a target exhaust temperature, resulting in large refrigerant flow and incomplete evaporation, such that the compressor may inhale some liquid when suction, which may cause compressor reliability issues such as liquid slugging.

SUMMARY

The present application provides a control method of a multi-tube air conditioner, a device, an air conditioner and a storage medium, aiming to solve the technical problem that the minimum limited opening of the current air conditioner is a fixed opening value, which causes an unstable operation problem of the air conditioner due to unreasonable minimum limited opening when the electronic expansion valve of the air conditioner is corrected.

In order to achieve the above objective, the present application provides a control method of a multi-tube air conditioner, including:

acquiring an exhaust temperature of a compressor of the multi-tube air conditioner and an evaporation temperature of a target indoor unit in the multi-tube air conditioner, in response to a detection of the multi-tube air conditioner being in a target operation state;

determining a target opening of an electronic expansion valve of the target indoor unit according to the exhaust temperature and the evaporation temperature of the target indoor unit;

acquiring a condensation temperature of the multi-tube air conditioner and determining a minimum limited opening of the electronic expansion valve of the multi-tube air conditioner according to the condensation temperature and the exhaust temperature; and adjusting an opening of the electronic expansion valve of the target indoor unit according to the target opening and the minimum limited opening.

In some embodiments, determining an exhaust deviation value according to the exhaust temperature and a target exhaust temperature, and determining an exhaust opening correction value according to the exhaust deviation value;

determining whether the exhaust deviation value is less than a preset exhaust deviation value;

in response to that the exhaust deviation value is less than the preset exhaust deviation value, determining an evaporation superheat degree opening correction value of the target indoor unit according to the evaporation temperature of the target indoor unit; and determining the target opening of the electronic expansion valve of the target indoor unit according to the exhaust opening correction value and the evaporation superheat degree opening correction value of the target indoor unit.

In some embodiments, determining whether an exhaust correction direction of the target indoor unit is consistent with an evaporation superheat degree correction direction;

in response to that the exhaust correction direction of the target indoor unit is consistent with the evaporation superheat degree correction direction, determining the opening of the electronic expansion valve of the target indoor unit; and determining the target opening of the electronic expansion valve of the target indoor unit according to the current opening, the evaporation superheat degree opening correction value of the target indoor unit and the exhaust opening correction value.

In some embodiments, in response to that the exhaust correction direction of the target indoor unit is inconsistent with the evaporation superheat degree correction direction, determining whether an exhaust correction direction of the target indoor unit is consistent with an evaporation superheat degree correction direction, when the multi-tube air conditioner entered the target operation state last time;

in response to that the exhaust correction direction of the target indoor unit is consistent with the evaporation superheat degree correction direction, when the multi-tube air conditioner entered the target operation state last time, determining the current opening of the electronic expansion valve of the target indoor unit; and determining the target opening of the electronic expansion valve of the target indoor unit according to the current opening, the evaporation superheat degree opening correction value of the target indoor unit and the exhaust opening correction value.

In some embodiments, in response to that the exhaust deviation value is greater than or equal to the preset exhaust deviation value, determining a current opening of the electronic expansion valve of the target indoor unit; and determining the target opening of the electronic expansion valve of the target indoor unit according to the current opening and the exhaust opening correction value.

In some embodiments, determining an outdoor temperature of an outdoor environment where the multi-tube air conditioner is located;

determining the minimum limited opening of the electronic expansion valve of the multi-tube air conditioner according to the outdoor temperature; and adjusting the opening of the electronic expansion valve of the target indoor unit according to the target opening and the minimum limited opening.

In some embodiments, when it is detected that an operation state of an indoor unit in the multi-tube air conditioner changes, determining a cooling capacity ratio corresponding to a target shutdown indoor unit, the target shutdown indoor unit is a shutdown indoor unit which switches from an on state to an off state;

in response to that the cooling capacity ratio corresponding to the target shutdown indoor unit is greater than or equal to a preset cooling capacity ratio, controlling an indoor fan of the target shutdown indoor unit to stop running and closing an electronic expansion valve of the target shutdown indoor unit after a preset time; and in response to that the cooling capacity ratio corresponding to the target shutdown indoor unit is less than the preset cooling capacity ratio, controlling the indoor fan of the target shutdown indoor unit to stop running and closing the electronic expansion valve of the target shutdown indoor unit.

In addition, in order to achieve the above objective, the present application provides a control device of a multi-tube air conditioner, including:

a first acquisition module, configured to acquire an exhaust temperature of a compressor of the multi-tube air conditioner and an evaporation temperature of a target indoor unit in the multi-tube air conditioner, in response to a detection of the multi-tube air conditioner being in a target operation state;

a determination module, configured to determine a target opening of an electronic expansion valve of the target indoor unit according to the exhaust temperature and the evaporation temperature of the target indoor unit;

a second acquisition module, configured to acquire a condensation temperature of the multi-tube air conditioner and determining a minimum limited opening of the electronic expansion valve of the multi-tube air conditioner according to the condensation temperature and the exhaust temperature; and an adjustment module, configured to adjust an opening of the electronic expansion valve of the target indoor unit according to the target opening and the minimum limited opening.

In order to achieve the above objective, the present application further provides an air conditioner, including a processor, a storage and a control program of a multi-tube air conditioner stored in the storage. When the control program of the multi-tube air conditioner is executed by the processor, operations of the above-mentioned control method of the multi-tube air conditioner are implemented.

In order to achieve the above objective, the present application further provides a computer storage medium. A control program of a multi-tube air conditioner is stored on the computer storage medium, when the control program of the multi-tube air conditioner is executed by a processor, operations of the above-mentioned control method of the multi-tube air conditioner are implemented.

Compared with the related art, the present application provides a control method of a multi-tube air conditioner. By acquiring an exhaust temperature of a compressor of the multi-tube air conditioner and an evaporation temperature of a target indoor unit in the multi-tube air conditioner, in response to a detection of the multi-tube air conditioner being in a target operation state; determining a target opening of an electronic expansion valve of the target indoor unit according to the exhaust temperature and the evaporation temperature of the target indoor unit; acquiring a condensation temperature of the multi-tube air conditioner and determining a minimum limited opening of the electronic expansion valve of the multi-tube air conditioner according to the condensation temperature and the exhaust temperature; and adjusting the opening of the electronic expansion valve of the target indoor unit according to the target opening and the minimum limited opening. Therefore, when the electronic expansion valve of the air conditioner is adjusted, the minimum limited opening of the current electronic expansion valve at the automatic control phase can be determined according to the operating parameters of the electronic expansion valve at the automatic control phase to avoid setting an unreasonable minimum limited opening, thereby maintaining a stable operation of the air conditioner.

DESCRIPTION OF REFERENCE SIGNS

| Reference sign | Name |
|---|---|
| 1 | outdoor fan |
| 2 | outdoor unit |
| 3 | four-way valve |
| 4 | compressor |
| 5 | gas-liquid separator |
| 6 | indoor unit |
| 7 | electronic expansion valve |
| 8 | shut-off valve |

The implementation, functional characteristics and advantages of the present application will be further described with reference to the attached drawings in combination with embodiments.

DETAILED DESCRIPTION OF THE EMBODIMENTS

It should be understood that the specific embodiments described here are only used to explain the present application and are not used to limit the present application.

Figure 1:
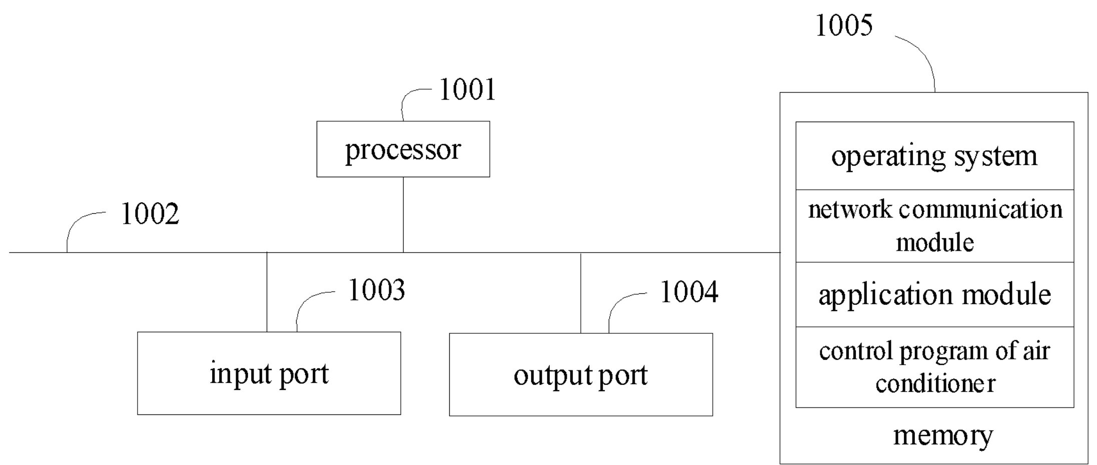
FIG. 1 is a schematic view of a hardware structure of an air conditioner involved in some embodiments of the present application.

As shown in FIG. 1, FIG. 1 is a schematic view of a hardware structure of an air conditioner involved in some embodiments of the present application. In some embodiments of the present application, the air conditioner may include a processor 1001 (such as a Central Processing Unit, CPU), a communication bus 1002, an input port 1003, an output port 1004, and a memory 1005. The communication bus 1002 is used to realize connection communication between these components. The input port 1003 is used for data input. The output port 1004 is used for data output. The memory 1005 can be a high-speed Random Access Memory (RAM) memory or a stable memory (non-volatile memory), such as disk memory. The memory 1005 can also be a storage device independent of the aforementioned processor 1001. Those skilled in the art can understand that the hardware structure shown in FIG. 1 does not limit the present application, and may include more or fewer components than shown, or combine certain components, or arrange different components.

Continuing to refer to FIG. 1, the memory 1005 as a readable storage medium in FIG. 1 may include an operating system, a network communication module, an application module, and a control program of a multi-tube air conditioner. In the terminal shown in FIG. 1, a network interface is mainly used to connect to a backend server and perform data communication with the backend server. A user interface is mainly used to connect to a client end (user end) and perform data communication with the client end. The processor 1001 can be used to call the control program of the multi-tube air conditioner stored in the memory 1005.

In some embodiments, the control device of the multi-tube air conditioner includes the memory 1005, the processor 1001 and the control program of the multi-tube air conditioner stored on the memory 1005 and executable on the processor 1001. When the processor 1001 calls the control program of the multi-tube air conditioner stored in the memory 1005, the following operations are performed:

- acquiring an exhaust temperature of a compressor of the multi-tube air conditioner and an evaporation temperature of a target indoor unit in the multi-tube air conditioner, in response to a detection of the multi-tube air conditioner being in a target operation state;
- determining a target opening of an electronic expansion valve of the target indoor unit according to the exhaust temperature and the evaporation temperature of the target indoor unit;
- acquiring a condensation temperature of the multi-tube air conditioner and determining a minimum limited opening of the electronic expansion valve of the multi-tube air conditioner according to the condensation temperature and the exhaust temperature; and
- adjusting an opening of the electronic expansion valve of the target indoor unit according to the target opening and the minimum limited opening.

Figure 2:
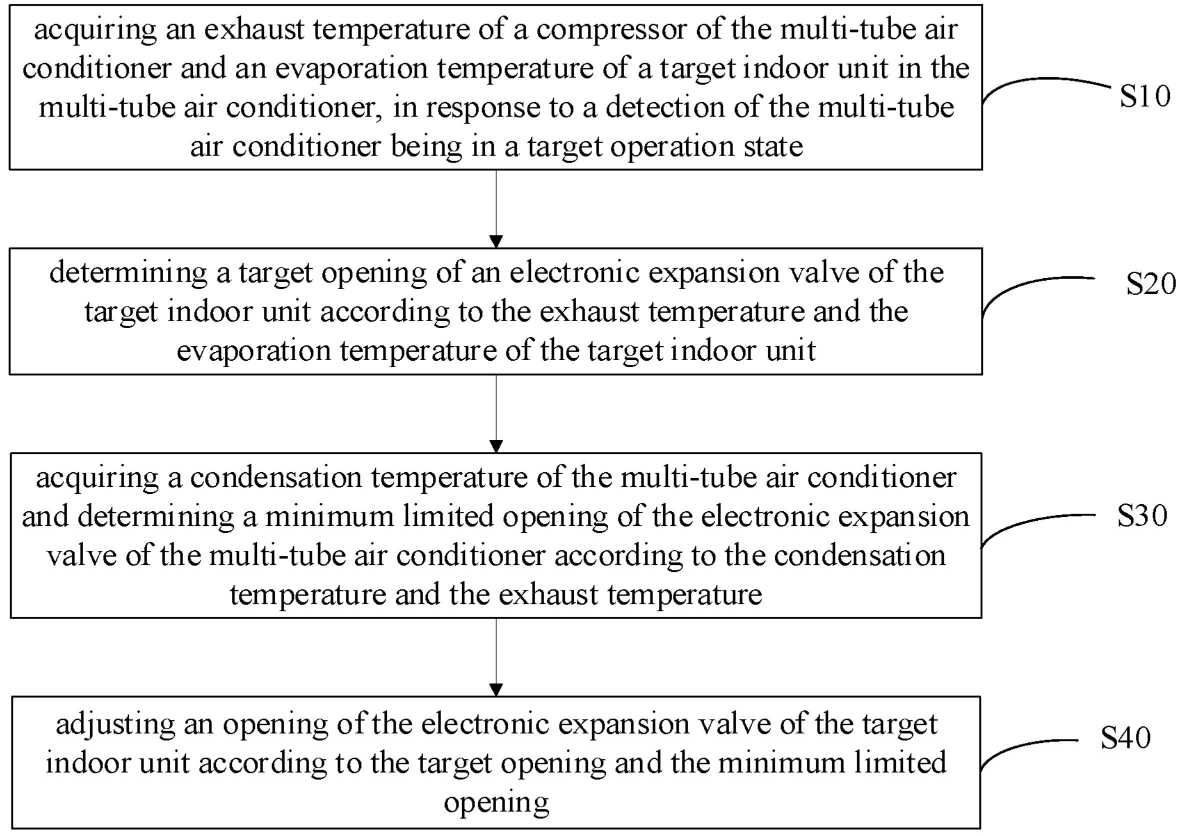
FIG. 2 is a schematic flowchart of a control method of a multi-tube air conditioner according to a first embodiment of the present application.

Based on the hardware structure shown in FIG. 1, the first embodiment of the present application provides a control method of a multi-tube air conditioner. As shown in FIG. 2, FIG. 2 is a schematic flowchart of a control method of a multi-tube air conditioner according to a first embodiment of the present application.

The present application provides some embodiments of a control method of a multi-tube air conditioner. It should be noted that although the logical sequence is shown in the flow chart, in some cases, the shown or described steps can be executed in a sequence different from that here.

Specifically, the control method of a multi-tube air conditioner in some embodiments includes:

S10, acquiring an exhaust temperature of a compressor of the multi-tube air conditioner and an evaporation temperature of a target indoor unit in the multi-tube air conditioner, in response to a detection of the multi-tube air conditioner being in a target operation state.

Figure 3:
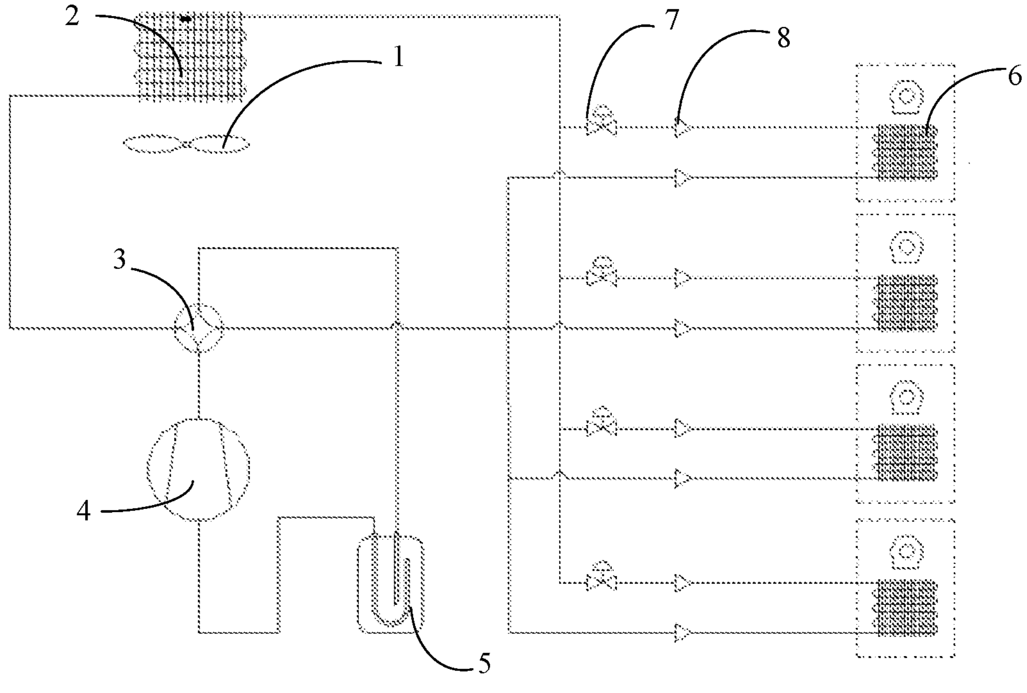
FIG. 3 is a schematic structural view of a scene of a multi-tube air conditioner involved in the control method of a multi-tube air conditioner according to the present application.

It should be noted that the above-mentioned multi-tube air conditioner refers to an air conditioner system composed of one outdoor unit group and multiple indoor units. As shown in the schematic view of the multi-tube air conditioner system shown in FIG. 3, the outdoor unit group consists of an outdoor fan, an outdoor unit, a four-way valve, a compressor and a gas-liquid separator. Each indoor unit includes an indoor unit, at least one electronic expansion valve and a shut-off valve. The operation of each indoor unit will not interfere each other, which will not be repeated in these embodiments herein.

In these embodiments, the above mentioned target operation state refers to the state that indoor unit in the air conditioner unit enters an automatic control phase of the electronic expansion valve when the multi-tube air conditioner is performing low-temperature refrigeration. For example, a control period of the automatic control phase of the electronic expansion valve is 40 seconds, and the multi-tube air conditioner includes an indoor unit A that is running and an indoor unit B that is in standby state. When it is detected that the time interval between the indoor unit A that is running and the last automatic control phase of the electronic expansion valve reaches 40 s, the indoor unit A is again controlled to enter the automatic control phase of the electronic expansion valve. In addition, for the indoor unit B in the standby state, when the indoor unit B enters the power-on state, and it is detected that the indoor unit B continues to run in the power-on state for 40 seconds, the indoor unit A is controlled to enter the automatic control phase of the electronic expansion valve. In addition, the above control period can also be of other lengths, such as any length of 20 s to 40 s, which is not limited in these embodiments.

It should be further noted that in these embodiments, the above mentioned target indoor unit refers to an indoor unit with capacity demands. The indoor unit with capacity demands refers to that there is a temperature difference between the set temperature of the indoor unit and the indoor temperature, which requires the outdoor unit to provide load, so that the indoor unit can meet user needs or functional requirements. In other words, in these embodiments, when it is detected that the indoor unit with capacity demands enters the automatic control phase of the electronic expansion valve, the indoor unit is controlled according to the set control mechanism to regulate the electronic expansion valve.

In this step, the evaporation temperature is collected when it is detected that the indoor unit with capacity demand enters the automatic control phase of the electronic expansion valve. It should be noted that in these embodiments, the evaporation temperature can be the temperature in the middle of the evaporator, or can be the saturation temperature of the refrigerant corresponding to the suction pressure of the evaporator, which is not limited in these embodiments. For example, the evaporation temperature is collected through a temperature sensor or temperature sensing package installed at the middle coil of the evaporator. In some embodiments, the evaporator outlet temperature is obtained. The electronic expansion valve of the indoor unit with capacity demands is regulated through the above two temperatures, so that the corresponding indoor temperature of the indoor unit reaches the set temperature.

Step S20, determining a target opening of an electronic expansion valve of the target indoor unit according to the exhaust temperature and the evaporation temperature of the target indoor unit.

Specifically, the above mentioned target opening refers to the opening required to make the corresponding indoor temperature of the indoor unit reach the set temperature.

It is worth noting that the above target opening is related to two parameters. Therefore, in these embodiments, when determining the target opening, the opening correction and adjustment strategies corresponding to the exhaust temperature and evaporation temperature are determined respectively. Finally, according to the parameters of the current operation of the air conditioner, the final opening correction and adjustment strategies is determined.

For ease of understanding, these embodiments illustrates the above step S20 with an example.

For example, for indoor unit C with capacity demands, when it is detected that the indoor unit C with capacity demands enters the automatic control phase of the electronic expansion valve, it is obtained that the current exhaust temperature is 123° C., and the evaporator outlet temperature of the indoor unit C is 5° C. When performing the exhaust correction adjustment based on the current exhaust temperature of the indoor unit C, the current target exhaust temperature of the compressor is determined based on the actual operating frequency of the current compressor and the outdoor temperature, such as, 119° C., which means that the temperature difference between the current exhaust temperature and the target exhaust temperature is 4° C. In other words, if the current exhaust temperature of the compressor is higher than the target exhaust temperature, the opening of the electronic expansion valve increases, for example, increasing by 12 P. In addition, if it is currently necessary to increase the opening of the electronic expansion valve according to the evaporation temperature, such as increasing the opening by 6 P. Thus, when adjusting the electronic expansion valve, the opening of the electronic expansion valve can be increased by 18 P. In addition, if the correction value of the opening of the electronic expansion valve is too large, the opening of the electronic expansion valve can also be increased by only 12 P, which is not limited in these embodiments.

Step S30, acquiring a condensation temperature of the multi-tube air conditioner and determining a minimum limited opening of the electronic expansion valve of the multi-tube air conditioner according to the condensation temperature and the exhaust temperature.

Specifically, the above-mentioned minimum limited opening is a limited opening determined based on the current operating parameters at the automatic control phase of the electronic expansion valve. That is, in the embodiment, the minimum limited opening is not a fixed value, but relevant to the actual operating conditions at the automatic control phase of the electronic expansion valve.

It is easy to understand that since the operating parameters of the air conditioner are flexibly changed when the air conditioner is performing low-temperature refrigeration operation. Therefore, if only a fixed minimum limited opening is set to limit the adjustment of the opening of the electronic expansion valve of the air conditioner, when the minimum limited opening set is unreasonable, such as the opening set is too small, the high frequency of the compressor and too small opening can lead to poor flow of refrigerant, resulting in low pressure on the suction side, such that the air conditioner can trip due to low pressure protection. At the same time, setting the opening too small can result in insufficient refrigerant flow, resulting in low capacity. When the opening is set too large, the exhaust temperature is much lower than the target exhaust temperature, resulting in large refrigerant flow and incomplete evaporation, such that the compressor suction may also carry liquid, causing compressor reliability problems such as liquid slugging. Therefore, in order to avoid the above problems, in the embodiment, the limited opening of the current electronic expansion valve in the automatic control phase is determined according to the operating parameters at the automatic control phase of the electronic expansion valve.

In the step, the above-mentioned condensation temperature can be the temperature in the middle of the condenser, or can be the saturation temperature of the refrigerant corresponding to the condensation exhaust pressure, which is not limited in the embodiment. For example, in the embodiment, the temperature in the middle of condenser is collected through the temperature sensing package provided in the middle coil of the condenser.

Furthermore, in order to improve the rationality of the minimum limited opening setting, the embodiment proposes a specific implementation method for setting the minimum limited opening in combination with the above two temperature parameters.

After the automatic control phase of the electronic expansion valve, an exhaust superheat degree at the current phase is determined. The exhaust superheat degree is determined based on two temperature parameters of the condensation temperature and the exhaust temperature. After the exhaust superheat degree at the current phase is obtained, a temperature range of the exhaust superheat degree in the current phase is determined, and finally the minimum limited opening matching the exhaust superheat degree in the current phase is obtained according to the calculation formula of the minimum limited opening matched in each temperature interval, wherein the calculation formula of the minimum limited opening is:

$$EEV\min = \begin{cases} K*F+m; (Tp-T \geq X) \\ F-n+m; (Tp-T < X) \end{cases},$$

where the value range of X is from 5° ° C. to 15° C., in some embodiments, 12° C.;

The above F refers to the operating frequency of the compressor; K refers to the frequency coefficient; m refers to a factor of the electronic expansion valve; n refers to the engineering setting value; Tp refers to the exhaust temperature; and T refers to the condensation temperature, wherein the value range of K is from 1 to 2.5, in some embodiments, 1.3; the value range of m is from 20 to 60, in some embodiments, 30; and the value range of n is from 15 to 40, in some embodiments, 25.

In order to facilitate understanding, the embodiment illustrates the above steps with examples.

For example, X is 12° C.; K is 1.3; and m is 25. The indoor units which enter the automatic control phase of the electronic expansion valve includes an indoor unit group D and an indoor unit group E. When the operating frequency of the compressor is 50 HZ, the exhaust superheat degree of the indoor unit group D is 15° C., and the exhaust superheat degree of the indoor unit group E is 10° C., according to the above formula $EEV_{min}$=K*F+m, the $EEV^{D}_{min}$ of the indoor unit group D is 95 P, and according to the above formula $EEV_{min}$=K−n+m, the $EEV^{F}_{min}$ of the indoor unit group D is 55 P. Furthermore, in the embodiment, the downward rounding principle is followed when calculating $EEV_{min}$, for example, when $EEV_{min}$=58.9 is obtained according to the above calculation formula, the minimum limited opening is set to 58 P.

Furthermore, in another embodiment, since the cooling loads required under different outdoor temperature conditions are different, in the embodiment, the minimum limited opening can also be determined according to the outdoor temperature, so that the opening of the electronic expansion valve of the target indoor unit can be adjusted according to the target opening and the minimum limited opening. Specifically, a correspondence table of the outdoor temperature and the minimum limited opening shown Table 1 below is referred to.

In order to facilitate understanding, the embodiment is illustrated in conjunction with Table 1. When it is at the automatic control phase of the electronic expansion valve, and the current outdoor temperature is 13° C. collected by the sensor arranged in the outdoor environment, the minimum limited opening of the indoor unit on the indoor side at the current phase is limited to 90 P. When the current outdoor temperature is collected to be 10° C., the minimum limited opening of the indoor unit on the indoor side at the current phase is limited to 110 P. When the current outdoor temperature is collected to be 4° C., the minimum limited opening of the indoor unit on the indoor side at the current phase is limited to 80 P. When the current outdoor temperature is collected to be −8° C., the minimum limited opening of the indoor unit on the indoor side at the current phase is limited to 80 P. When the current outdoor temperature is collected to be −20° C., the minimum limited opening of the indoor unit on the indoor side at the current phase is limited to 90 P.

TABLE 1

| correspondence table of the outdoor temperature and the minimum limited | |
|---|---|
| outdoor temperature | opening range |
| T' ≥ 12°C | 60P to 120P |
| 5° C. ≤ T' < 12° C. | 80P to 140P |
| −5° C. ≤ T' < 5° C. | 50P to 110P |
| −12° C. ≤ T' < −5° C. | 50P to 110P |
| T' < −12° C. | 60P to 120P |

Step S40, adjusting an opening of the electronic expansion valve of the target indoor unit according to the target opening and the minimum limited opening.

In this step, when adjusting the opening, it is necessary to determine whether the target opening exceeds the minimum limited opening allowed in the current phase at first. If it exceeds, the opening of the electronic expansion valve is adjusted to the minimum limited opening allowed in the current phase. In addition, in order to avoid excessive opening, in the embodiment, a corresponding upper limit opening is also set based on the equipment parameters of the air conditioner. For example, the upper limit opening of the electronic expansion valve is 480 P, then when the target opening exceeds the upper limit opening of 480 P, the opening of the electronic expansion valve is controlled and adjusted to the upper limit opening of 480 P.

It should be understood that the above are only examples and do not constitute any limitation on the technical solution of the present application. Those skilled in the art can make settings based on needs in practical applications, and they will not be listed here one by one.

In these embodiments, when adjusting the electronic expansion valve of the air conditioner, the minimum limited opening of the current electronic expansion valve at the automatic control phase is determined according to the operating parameters at the automatic control phase of the electronic expansion valve, thereby avoiding setting an unreasonable minimum limited opening and maintaining stable operation of the air conditioner.

Furthermore, based on the first embodiment of the control method of the multi-tube air conditioner of the present application, a second embodiment of the control method of the multi-tube air conditioner of the present application is proposed.

Figure 4:
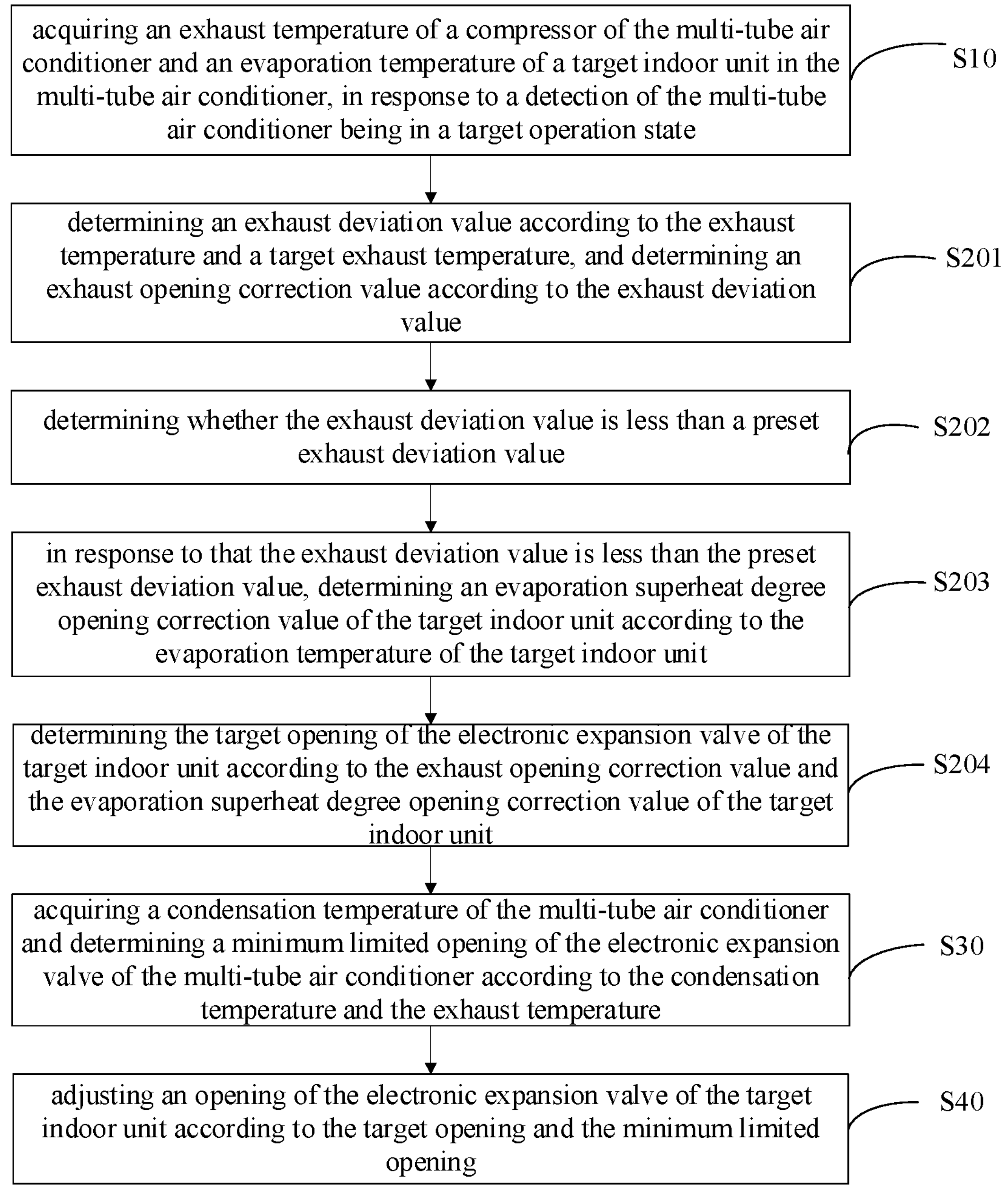
FIG. 4 is a schematic flowchart of the control method of a multi-tube air conditioner according to a second embodiment of the present application.

Referring to FIG. 4, which is a schematic flowchart of a control method of a multi-tube air conditioner according to a second embodiment of the present application.

The difference between the second embodiment and the first embodiment is that the step S20 specifically includes:

- step S201, determining an exhaust deviation value corresponding to the exhaust temperature and a target exhaust temperature, and determining an exhaust opening correction value according to the exhaust deviation value;
- step S202, determining whether the exhaust deviation value is less than a preset exhaust deviation value;
- step S203, in response to that the exhaust deviation value is less than the preset exhaust deviation value, determining an evaporation superheat degree opening correction value of the target indoor unit according to the evaporation temperature of the target indoor unit; and
- step S204, determining the target opening of the electronic expansion valve of the target indoor unit according to the exhaust opening correction value and the evaporation superheat degree opening correction value of the target indoor unit.

Specifically, the above target exhaust temperature refers to the actual temperature that should be measured by the exhaust temperature sensing package at the compressor under the current actual operating frequency of the compressor and the outdoor temperature. The above exhaust deviation value refers to the absolute difference between the exhaust temperature and the target exhaust temperature. The above-mentioned exhaust deviation value refers to a preset fixed value, such as 6° ° C.

In the embodiment, the target exhaust temperature is calculated based on the actual operating frequency of the compressor and the outdoor temperature through the following relationship: $TP_{\_trg}$=aF+b+T'+c. F refers to the operating frequency of the compressor; a refers to the frequency coefficient, and the value range of the frequency coefficient can be 0.2 to 1, in some embodiments, is 0.7; and b refers to the temperature-related factor, and the value range of the temperature-related factor can be −20 to 20, in some embodiments, is 4; T' refers to the outdoor ambient temperature. It should be noted that when the outdoor ambient temperature is less than zero, the outdoor ambient temperature is treated as zero, for example, when T' is −5° C., and the target exhaust temperature is calculated based on the above relationship, T' is substituted into 0 for calculation; c refers to the frequency correlation factor. It should be noted that in the embodiment, the frequency correlation factor is related to the current compressor operating frequency F, when F≤30 HZ, c is 2; when 30 HZ<F≤50 HZ, c is 1; when F≤30 HZ, c is 2; and when F>50 HZ, c is 0.

In this step, after calculating the target exhaust temperature according to the actual operating frequency of the compressor and the outdoor temperature through the following relationship, the exhaust deviation value between the exhaust temperature and the target exhaust temperature is calculated, and finally the corresponding exhaust opening correction value is determined according to the exhaust correction rules. Specifically, the deviation temperature interval in which the exhaust deviation value is located is determined, and finally the opening correction value matching the exhaust deviation value is obtained according to the opening correction value matching each deviation temperature interval. The deviation intervals include seven intervals. The deviation intervals from low to high are a first deviation interval, a second deviation interval, a third deviation interval, a fourth deviation interval, a fifth deviation interval, a sixth deviation interval and a seventh deviation interval. When it is in the first deviation interval, the electronic expansion valve reduces a first preset opening. When it is in the second deviation interval, the electronic expansion valve reduces a second preset opening. When it is in the third deviation interval, the electronic expansion valve reduces a third preset opening. When it is in the fourth deviation interval, there is no need to correct the opening of the electronic expansion valve according to the exhaust deviation. When it is in the fifth deviation interval, the electronic expansion valve increases the third preset opening. When it is in the sixth deviation interval, the electronic expansion valve increases the second preset opening. When it is in the seventh deviation interval, the electronic expansion valve increases the first preset opening, wherein the first preset opening is greater than the second preset opening, and the second preset opening is greater than the third preset opening.

TABLE 2

Exhaust correction rule table

| exhaust deviation value $^{\Delta}T$ | opening correction value |
|---|---|
| $^{\Delta}T < -4°$ C. | −18P |
| −4° C. ≤ $^{\Delta}T < -3°$ C. | −12P |
| −3° C. ≤ $^{\Delta}T < -2°$ C. | −6P |
| −2° C. ≤ $^{\Delta}T$ ≤ 2° C. | 0 |
| 2° C. < $^{\Delta}T$ ≤ 3° C. | −6P |
| 3° C. < $^{\Delta}T$ ≤ 4° C. | 12P |
| $^{\Delta}T > 4°$ C. | 18P |

For ease of understanding, it is illustrated in combination with the exhaust correction rule shown in Table 2. For example, if the current exhaust deviation value ΔT=3° C. is measured, it means that the current exhaust opening correction value is 6 P, that is, the opening of the electronic expansion valve degree is increased by 6 P. If the current exhaust value ΔT=4° C. is measured, it means that the evaporation superheat degree opening correction value is 12 P, that is, the opening of the electronic expansion valve is increased by 12 P. If the current exhaust value ΔT=2° C. is measured, it means that there is no need to correct the opening of the electronic expansion valve according to the exhaust deviation. If the current exhaust value ΔT=(−3° C.) is measured, it means that the current evaporation superheat degree opening correction value is −6 P, that is, the opening of the electronic expansion valve is reduced by 6 P.

In this step, after the target exhaust temperature is obtained based on the actual operating frequency of the compressor and the outdoor temperature, the exhaust deviation value is calculated, and then the corresponding correction strategy is executed based on the exhaust deviation value. In the embodiment, the preset exhaust deviation value is 6° C. For example, when the measured exhaust deviation value is 5° C., it indicates that both the exhaust correction and the evaporation superheat degree correction need to be adjusted together. In other words, when an opening correction value A is obtained based on the exhaust temperature and an opening correction value B is obtained based on the evaporation temperature, the final target opening correction value is obtained based on the opening correction value A and the opening correction value B, such as A+B, A−B, A or B, etc.

Further, in the embodiment, the evaporation superheat degree opening correction value is determined based on the preset evaporation superheat degree correction rules. Specifically, the evaporation superheat degree is firstly calculated, then the superheat degree temperature interval in which the evaporation superheat degree is located is determined, and finally the opening correction value matching the evaporation superheat degree is obtained according to the opening correction value matching the temperature interval of each superheat degree. For example, the evaporation superheat degree interval includes five intervals. The superheat degree from high to low are a first evaporation superheat degree interval, a second evaporation superheat degree interval, a third evaporation superheat degree interval, a fourth evaporation superheat degree interval and a fifth evaporation superheat degree interval. When in the first evaporation superheat degree interval, the electronic expansion value increases the first preset opening. When in the second evaporation superheat degree interval, the electronic expansion value increases the second preset opening. When in the third evaporation superheat degree interval, there is no need to correct the opening of the electronic expansion valve according to the evaporation superheat degree. When in the fourth evaporation superheat degree interval, the electronic expansion value reduces the second preset opening. When in the fifth evaporation superheat degree interval, the electronic expansion value reduces the first preset opening, wherein the first preset opening is greater than the second preset opening.

For ease of understanding, an example is given with the evaporation superheat degree correction rule shown in Table 3 below. For example, if the current evaporation superheat degree ΔT=3° C. is measured, it indicates that the current evaporation superheat degree opening correction value is 8 P, that is, the electronic expansion valve increases the opening by 8 P. When the current evaporation superheat degree ΔT=2° C. is measured, it means that the current evaporation superheat degree opening correction value is 4 P, that is, the electronic expansion valve increases the opening by 8 P. When the current evaporation superheat degree ΔT=1° C. is measured, it means that there is no need to correct the opening of the electronic expansion valve according to the evaporation superheat degree. When the current evaporation superheat degree ΔT=(−3° C.) is measured, it means that the evaporation superheat degree opening correction value is −4 P, that is, the electronic expansion valve reduces the opening by 4 P. When the current evaporation superheat degree ΔT=(−5)° C. is measured, it indicates that the evaporation superheat degree opening correction value is −8 P, that is, the electronic expansion valve reduces the opening by 8 P.

TABLE 3

| Evaporation superheat degree correction rule table | |
|---|---|
| evaporation superheat degree $^{\Delta}T$ | opening correction value |
| $^{\Delta}T > 2°$ C. | 8P |
| 1° C. $< {}^{\Delta}T \leq 2°$ C. | 4P |
| −1° C. $< {}^{\Delta}T \leq 1°$ C. | 0P |
| −3° C. $< T' < -1°$ C. | −4P |
| $T' < -3°$ C. | −8P |

In addition, it should be noted that the evaporation superheat degree of each of the above-mentioned indoor units with capacity demands is related to the evaporation superheat degree of other indoor units with capacity demands in the air conditioner system, that is, the evaporation superheat degree $\Delta T = T_b - T_b\_avg$, wherein $T_b$ refers to the evaporation temperature of the indoor unit that has the capacity demand, and $T_b\_avg$ refers to the average evaporator temperature of all indoor units that have the capacity demand in the current air conditioner system, wherein the above evaporation temperature can be the evaporator outlet temperature, the evaporator middle temperature and the evaporator inlet temperature, which is not limited in these embodiments. In these embodiments, the temperature collected by a temperature sensor or temperature sensing package installed at the evaporator outlet is used to calculate the evaporation superheat degree of each indoor unit with capacity demands.

Furthermore, when the exhaust correction value and the evaporation superheat degree correction need to be adjusted together, in order to improve the correction accuracy, in these embodiments, correction directions of the exhaust correction value and the evaporation superheat degree correction are also combined for joint adjustment. Specifically, After obtaining the exhaust opening correction value and the evaporation superheat degree opening correction value, it is firstly determined that whether the exhaust correction direction and the evaporation superheat degree correction direction are consistent. If the correction directions are consistent, the correction values are accumulated to obtain the target correction opening value, and then obtain the target opening.

It should be noted that whether the above-mentioned exhaust correction direction and the evaporation superheat degree correction direction are consistent refers to whether they are both increasing corrections or whether they are both decreasing corrections. For example, if the evaporation superheat degree opening correction value is 8 P, the exhaust opening correction value is −6 P, which indicates that the current correction directions of the two are inconsistent. If one of the correction values is 8 P and the other correction value is 10 P, then the corrections are accumulated to obtain the target correction opening value of 18 P, which is about to increase the opening by 18 P.

Furthermore, in response to that the exhaust correction direction is inconsistent with the evaporation superheat degree correction direction, determining whether an exhaust correction direction is consistent with an evaporation superheat degree correction direction, when the multi-tube air conditioner entered the target operation state last time; in response to that the exhaust correction direction is consistent with the evaporation superheat degree correction direction, when the multi-tube air conditioner entered the target operation state last time, determining the current opening of the electronic expansion valve of the target indoor unit; and determining the target opening of the electronic expansion valve of the target indoor unit according to the current opening, the evaporation superheat degree opening correction value of the target indoor unit and the exhaust opening correction value.

In addition, after the step S202, the method further includes: in response to that the exhaust deviation value is greater than or equal to the preset exhaust deviation value, determining a current opening of the electronic expansion valve of the target indoor unit; and determining the target opening of the electronic expansion valve of the target indoor unit according to the current opening and the exhaust opening correction value.

That is to say, in these embodiments, when the exhaust deviation value is too large, the exhaust correction adjustment is given priority, and no correction is performed based on the evaporation superheat degree. To facilitate understanding, these embodiments illustrates this with an example. For example, the current exhaust deviation value is 12° C., and the preset exhaust deviation value is 6° C. The current evaporation superheat degree opening correction value obtained based on the evaporation superheat degree of the air conditioner is 8 P. The exhaust opening correction value currently obtained based on the exhaust temperature of the air conditioner is −6 P. Since the current exhaust deviation value of 12° C. exceeds 6° C., the current electronic expansion valve at automatic control phase controls the opening of the electronic expansion valve to decrease by 6 P.

It should be understood that the above are only examples and do not constitute any limitation on the technical solution of the present application. Those skilled in the art can make settings based on needs in practical applications, and they will not be listed here one by one.

In these embodiments, after obtaining the target exhaust temperature based on the actual operating frequency of the compressor and the outdoor temperature, the exhaust deviation value is calculated, and then the corresponding correction strategy is executed based on the exhaust deviation, thereby improving the low-temperature cooling capacity of the air conditioner and air conditioner unit reliability.

Furthermore, based on the first embodiment of the control method of the multi-tube air conditioner of the present application, a third embodiment of the control method of the multitube air conditioner of the present application is proposed.

Figure 5:
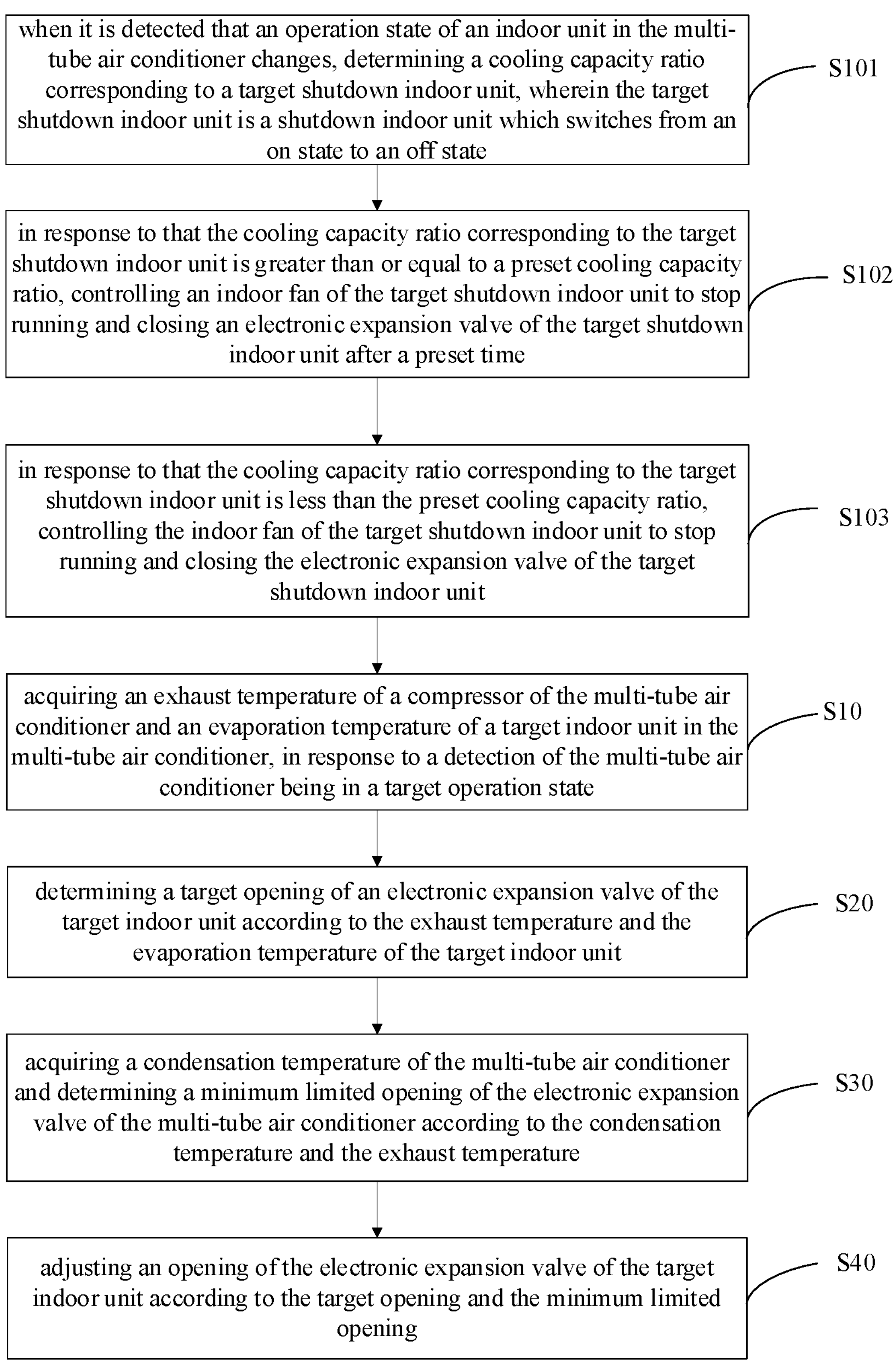
FIG. 5 is a schematic flowchart of the control method of a multi-tube air conditioner according to a third embodiment of the present application.

Referring to FIG. 5, which is a schematic flowchart of a control method of a multi-tube air conditioner according to a third embodiment of the present application.

The difference between the third embodiment and the first embodiment is that before the step S10, the method further includes:

step S101, when it is detected that an operation state of an indoor unit of the multi-tube air conditioner changes, determining a cooling capacity ratio corresponding to a target shutdown indoor unit, wherein the target shutdown indoor unit is a shutdown indoor unit which switches from an on state to an off state;

step S102, in response to that the cooling capacity ratio corresponding to the target shutdown indoor unit is greater than or equal to a preset cooling capacity ratio, controlling an indoor fan of the target shutdown indoor unit to stop running and closing an electronic expansion valve of the target shutdown indoor unit after a preset time; and step S103, in response to that the cooling capacity ratio corresponding to the target shutdown indoor unit is less than the preset cooling capacity ratio, controlling the indoor fan of the target shutdown indoor unit to stop running and closing the electronic expansion valve of the target shutdown indoor unit.

Specifically, that an operation state of an indoor unit changes refers to the changes in the on-off status of the indoor unit, and the above-mentioned the cooling capacity ratio refers to the ratio of the rated cooling capacity of the indoor unit to the rated cooling capacity of the outdoor unit.

In these embodiments, in order to prevent the load of the indoor unit from changing too much when the indoor unit of the air conditioner unit is turned on and off, resulting in unstable operation of the air conditioner unit, the opening of the electronic expansion valve of each newly shut down indoor unit is adjusted based on the rated cooling capacity of each newly shut down indoor unit. In order to facilitate understanding, these embodiments uses the preset refrigeration capacity ratio of 40% as an example. In these embodiments, the preset refrigeration capacity ratio can also be set to other values, such as 50%, these embodiments do not limit this.

For example, for a newly shut down indoor unit F, the cooling capacity ratio of the indoor unit F is 43%. When the newly shut down indoor unit F receives the shutdown command, it immediately shuts down the indoor fan according to the shutdown command to notify the user of the current situation that the shutdown command has been executed. At the same time, in order to avoid the indoor unit load changing too much, the indoor unit F maintains the current opening of the electronic expansion valve unchanged until the maintenance time reaches 3 minutes and then closes it. For a newly shut down indoor unit G, the cooling capacity ratio of the indoor unit G is 33%, then when the newly shut down indoor unit G receives the shutdown command, it immediately shuts down the indoor fan according to the shutdown command. At the same time, because the cooling capacity ratio of the indoor unit G is relatively small, that is, the rated cooling capacity of the indoor unit G is not much different from the rated cooling capacity of the outdoor unit, the electronic expansion valve of the indoor unit G can be closed immediately when the shutdown command is received.

In addition, indoor units in other operating states in the multi-tube air conditioner include newly started indoor units and other indoor units excluding newly started indoor units and newly shut down indoor units. The newly started indoor units are adjusted according to the preset initial opening of the refrigeration, while the electronic expansion valves of other indoor units keep the current opening unchanged until the multi-tube air conditioner enters the automatic control phase of the electronic expansion valve.

It should be understood that the above are only examples and do not constitute any limitation on the technical solution of the present application. Those skilled in the art can make settings based on needs in practical applications, and they will not be listed here one by one.

In these embodiments, when an indoor unit is turned on and off in the multi-tube air conditioner, the opening of the electronic expansion valve of each newly shut down indoor unit is adjusted based on the rated cooling capacity of each newly shut down indoor unit, thereby improving air conditioner operation stability.

Figure 6:
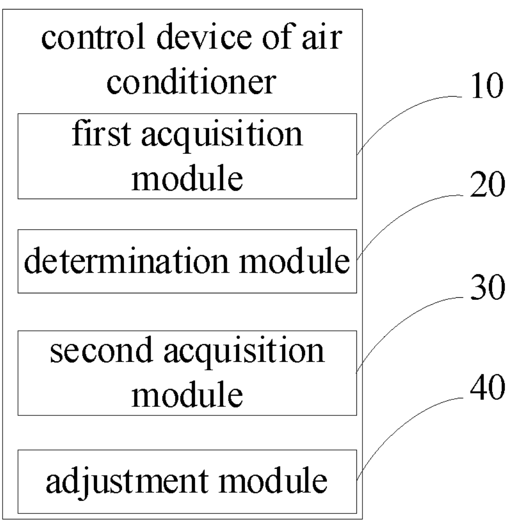
FIG. 6 is a schematic view of functional modules of a control device of the multi-tube conditioner according to some embodiments of the present application.

In addition, the present application also provides a control device for a multi-tube air conditioner. Referring to FIG. 6, which is schematic view of functional modules of a control device of a multi-tube conditioner according to some embodiments of the present application.

As shown in FIG. 6, the control device of a multi-tube air conditioner, including:

As shown in FIG. 5, the control device of a multi-tube air conditioner, including:

a first acquisition module 10, configured to acquire an exhaust temperature of a compressor of the multi-tube air conditioner and an evaporation temperature of a target indoor unit in the multi-tube air conditioner, in response to a detection of the multi-tube air conditioner being in a target operation state.

It should be noted that the above-mentioned multi-tube air conditioner refers to an air conditioner system composed of one outdoor unit and multiple indoor units. As shown the schematic diagram of the multi-tube air conditioner system shown in FIG. 3, the outdoor unit group consists of an outdoor fan, an outdoor unit, a four-way valve, a compressor and a gas-liquid separator. Each indoor unit group includes an indoor unit, at least one electronic expansion valve and a shut-off valve. The operation of each indoor unit will not interfere each other, which will not be repeated in these embodiments.

In these embodiments, the above mentioned target operation state refers to the indoor unit group in the multi-tube air conditioner entering an automatic control phase of the electronic expansion valve. For example, the control period of the automatic control phase of the electronic expansion valve in the multi-tube air conditioner is 40 seconds, and the multi-tube air conditioner includes an indoor unit group A that is running and an indoor unit group B that is in standby state. When it is detected that the time interval between the indoor unit group A that is running and the last automatic control phase of the electronic expansion valve reaches 40 s, the indoor unit A is again controlled to enter the automatic control phase of the electronic expansion valve. In addition, for the indoor unit group B in the standby state, when the indoor unit group B enters the power-on state, and it is detected that the indoor unit group B continues to run in the power-on state for 40 seconds, the indoor unit group A is controlled to enter the automatic control phase of the electronic expansion valve. In addition, the above control period can also be of other lengths, such as any length of 20 s to 40 s, which is not limited in these embodiments.

It should be further noted that in these embodiments, the above mentioned target indoor unit refers to an indoor unit with capacity demand. The indoor unit with capacity demand refers to that there is a temperature difference between the set temperature of the indoor unit and the indoor temperature, which requires the operation of the outdoor unit to provide load, so that the indoor unit can meet user needs or functional requirements. In other words, in these embodiments, when it is detected that the indoor unit with capacity demand enters the automatic control phase of the electronic expansion valve, the indoor unit is controlled according to the set control mechanism to regulate the electronic expansion valve.

The evaporation temperature is collected when it is detected that the indoor unit with capacity demand enters the automatic control phase of the electronic expansion valve. It should be noted that in these embodiments, the evaporation temperature can be the temperature in the middle of the evaporator, or it can also be the saturation temperature of the refrigerant corresponding to the suction pressure of the evaporator, which is not limited in these embodiments. For example, the evaporation temperature is collected through a temperature sensor or temperature sensing package installed at the middle coil of the evaporator. In some embodiments, the evaporator outlet temperature is obtained. The electronic expansion valve of the indoor unit with capacity demand is regulated through the above two temperatures, so that the corresponding indoor temperature of the indoor unit group reaches the set temperature.

A determination module 20, configured to determine a target opening of an electronic expansion valve of the target indoor unit according to the exhaust temperature and the evaporation temperature of the target indoor unit Specifically, the above mentioned target opening refers to the opening required to make the corresponding indoor temperature of the indoor unit reach the set temperature.

It is worth noting that the above target opening is related to two parameters. Therefore, in these embodiments, when determining the target opening, the opening correction and adjustment strategies corresponding to the exhaust temperature and evaporation temperature are determined respectively. Finally, according to the parameters of the current operation of the air conditioner, the final opening correction and adjustment strategies is determined.

A second acquisition module 30, configured to acquire a condensation temperature of the multi-tube air conditioner and determine a minimum limited opening of the electronic expansion valve of the multi-tube air conditioner according to the condensation temperature and the exhaust temperature.

Specifically, the above-mentioned minimum limited opening is a limited opening determined based on the current operating parameters in the automatic control phase of the electronic expansion valve. That is, in these embodiments, the minimum limited opening is not a fixed value, but relevant to the actual operating conditions in the automatic control phase of the electronic expansion valve.

It is easy to understand that since the operating parameters of the air conditioner are flexibly changed when the air conditioner is performing low-temperature refrigeration operation. Therefore, if only a fixed minimum limited opening is set to limit the adjustment of the opening of the electronic expansion valve of the air conditioner, when the minimum limited opening set is unreasonable, such as the opening set is too small. Due to the high frequency of the compressor and too small opening can lead to poor flow of refrigerant, resulting in low pressure on the suction side, such that the air conditioner can trip due to low pressure protection. At the same time, setting the opening too small can result in insufficient refrigerant flow, resulting in low capacity. When the opening is set too large, the exhaust temperature is much lower than the target exhaust temperature, resulting in large refrigerant flow and incomplete evaporation, such that the compressor suction may also carry liquid, causing compressor reliability problems such as liquid slugging. Therefore, in order to avoid the above problems, in these embodiments, the limited opening of the current electronic expansion valve in the automatic control phase is determined according to the operating parameters in the automatic control phase of the electronic expansion valve.

the above-mentioned condensation temperature can be the temperature in the middle of the condenser, or can also be the saturation temperature of the refrigerant corresponding to the condensation exhaust pressure, which is not limited in these embodiments. For example, in these embodiments, the temperature is collected through the temperature sensing package provided in the middle coil of the condenser.

An adjustment module 40, configured to adjust an opening of the electronic expansion valve of the target indoor unit according to the target opening and the minimum limited opening.

In these embodiments, when adjusting the electronic expansion valve of the air conditioner, the minimum limited opening of the current electronic expansion valve at the automatic control phase is determined according to the operating parameters at the automatic control phase of the electronic expansion valve, thereby avoiding setting an unreasonable minimum limited opening and maintaining stable operation of the air conditioner.

In addition, the present application also provide a computer storage medium. The computer storage medium stores a control program of a multi-tube air conditioner. The steps of the control method of the multi-tube air conditioner as described above are implemented when the control program of the multi-tube air conditioner is executed by a processor, which will not be repeated here.

Furthermore, it should be noted that, herein, the terms “include,” “comprise” or any other variations thereof are intended to encompass non-exclusive inclusions, so that a process, method, article or system literally including a series of elements includes not only those elements, but also other elements not expressly listed or inherent to such a process, method, article or system. Without further limitation, an element qualified by the phrase “including a . . . ” does not preclude the existence of additional identical elements in the process, method, article or system that includes the element.

The above-mentioned serial numbers of the embodiments of the present disclosure are only for description, and do not represent the advantages or disadvantages of the embodiments.

From the description of the above embodiments, those skilled in the art can clearly understand that the methods of the above embodiments can be implemented not only by means of a software plus a necessary general hardware platform, but also by means of a hardware. However, in many cases, the former is better. Based on this understanding, the technical solutions of the present disclosure in essence or the parts that make contributions to the related art can be embodied in the form of software products. The computer software products are stored in a storage medium (such as a read-only memory/random access memory, a magnetic disk or an optical disk, etc.), and include several instructions to make a terminal device execute the methods described in the various embodiments of the present disclosure.

The above are only some embodiments of the present application and do not limit the scope of the present application. Any equivalent structure or process changes made using the description and accompanying drawings of the present application, or directly or indirectly applied in other related technical fields, are equally included in the scope of the present application.

What is claimed is:

1. A control method of a multi-tube air conditioner comprising:

acquiring an exhaust temperature of a compressor of the multi-tube air conditioner and an evaporation temperature of a target indoor unit of the multi-tube air conditioner, in response to detecting the multi-tube air conditioner being in a target operation state;

determining a target opening of an electronic expansion valve of the target indoor unit according to the exhaust temperature and the evaporation temperature;

acquiring a condensation temperature of the multi-tube air conditioner;

determining a minimum limited opening of the electronic expansion valve according to the condensation temperature and the exhaust temperature; and adjusting an opening of the electronic expansion valve according to the target opening and the minimum limited opening.

2. The control method of claim 1, wherein determining the target opening includes:

determining an exhaust deviation value according to the exhaust temperature and a target exhaust temperature;

determining an exhaust opening correction value according to the exhaust deviation value;

determining whether the exhaust deviation value is less than a preset exhaust deviation value;

in response to that the exhaust deviation value is less than the preset exhaust deviation value, determining an evaporation superheat degree opening correction value of the target indoor unit according to the evaporation temperature; and determining the target opening according to the exhaust opening correction value and the evaporation superheat degree opening correction value.

3. The control method of claim 2, wherein determining the target opening according to the exhaust opening correction value and the evaporation superheat degree opening correction value includes:

determining whether an exhaust correction direction of the target indoor unit is consistent with an evaporation superheat degree correction direction.

4. The control method of claim 3, wherein determining the target opening according to the exhaust opening correction value and the evaporation superheat degree opening correction value further includes:

in response to that the exhaust correction direction is consistent with the evaporation superheat degree correction direction, determining a current opening of the electronic expansion valve of the target indoor unit; and determining the target opening according to the current opening, the evaporation superheat degree opening correction value, and the exhaust opening correction value.

5. The control method of claim 3, wherein determining the target opening according to the exhaust opening correction value and the evaporation superheat degree opening correction value further includes:

in response to that the exhaust correction direction of the target indoor unit is inconsistent with the evaporation superheat degree correction direction, determining whether an exhaust correction direction of the target indoor unit is consistent with an evaporation superheat degree correction direction when the multi-tube air conditioner entered the target operation state last time;

in response to that the exhaust correction direction is consistent with the evaporation superheat degree correction direction when the multi-tube air conditioner entered the target operation state last time, determining a current opening of the electronic expansion valve of the target indoor unit; and determining the target opening of the electronic expansion valve of the target indoor unit according to the current opening, the evaporation superheat degree opening correction value of the target indoor unit, and the exhaust opening correction value.

6. The control method of claim 1, wherein determining the target opening includes:

determining an exhaust deviation value according to the exhaust temperature and a target exhaust temperature;

determining an exhaust opening correction value according to the exhaust deviation value;

determining whether the exhaust deviation value is less than a preset exhaust deviation value;

in response to that the exhaust deviation value is greater than or equal to the preset exhaust deviation value, determining a current opening of the electronic expansion valve;

determining the target opening according to the current opening and the exhaust opening correction value.

7. The control method of claim 1, wherein the target indoor unit is one of one or more indoor units of the multi-tube air conditioner;

the method further comprising, before acquiring the exhaust temperature of the compressor of the multi-tube air conditioner and the evaporation temperature of the target indoor unit:

in response to detecting that an operation state of at least one of the one or more indoor units of the multi-tube air conditioner changes, determining a cooling capacity ratio corresponding to a target shutdown indoor unit, the target shutdown indoor unit being one of the one or more indoor units that is to switch from an on state to an off state;

in response to that the cooling capacity ratio corresponding to the target shutdown indoor unit is greater than or equal to a preset cooling capacity ratio, controlling an indoor fan of the target shutdown indoor unit to stop running, and closing an electronic expansion valve of the target shutdown indoor unit after a preset time; and in response to that the cooling capacity ratio corresponding to the target shutdown indoor unit is less than the preset cooling capacity ratio, controlling the indoor fan of the target shutdown indoor unit to stop running and closing the electronic expansion valve of the target shutdown indoor unit.

8. A non-transitory computer-readable storage medium storing a control program that, when executed by a processor, causes the processor to perform the control method of claim 1.

9. A control method of a multi-tube air conditioner comprising:

acquiring an exhaust temperature of a compressor of the multi-tube air conditioner and an evaporation temperature of a target indoor unit of the multi-tube air conditioner, in response to detecting the multi-tube air conditioner being in a target operation state;

determining a target opening of an electronic expansion valve of the target indoor unit according to the exhaust temperature and the evaporation temperature;

determining an outdoor temperature of an outdoor environment where the multi-tube air conditioner is located;

determining a minimum limited opening of the electronic expansion valve according to the outdoor temperature; and adjusting an opening of the electronic expansion valve according to the target opening and the minimum limited opening.

10. A multi-tube air conditioner comprising:

a processor; and a memory storing a control program that, when executed by the processor, causes the processor to:

acquire an exhaust temperature of a compressor of the multi-tube air conditioner and an evaporation temperature of a target indoor unit of the multi-tube air conditioner, in response to detecting the multi-tube air conditioner being in a target operation state;

determine a target opening of an electronic expansion valve of the target indoor unit according to the exhaust temperature and the evaporation temperature;

acquire a condensation temperature of the multi-tube air conditioner;

determine a minimum limited opening of the electronic expansion valve according to the condensation temperature and the exhaust temperature; and adjust an opening of the electronic expansion valve according to the target opening and the minimum limited opening.

11. The multi-tube air conditioner of claim 10, wherein the program further causes the processor to:

determine an exhaust deviation value according to the exhaust temperature and a target exhaust temperature;

determine an exhaust opening correction value according to the exhaust deviation value;

determine whether the exhaust deviation value is less than a preset exhaust deviation value;

in response to that the exhaust deviation value is less than the preset exhaust deviation value, determine an evaporation superheat degree opening correction value of the target indoor unit according to the evaporation temperature; and determine the target opening according to the exhaust opening correction value and the evaporation superheat degree opening correction value.

12. The multi-tube air conditioner of claim 11, wherein the program further causes the processor to:

determine whether an exhaust correction direction of the target indoor unit is consistent with an evaporation superheat degree correction direction.

13. The multi-tube air conditioner of claim 12, wherein the program further causes the processor to:

in response to that the exhaust correction direction is consistent with the evaporation superheat degree correction direction, determine a current opening of the electronic expansion valve of the target indoor unit; and determine the target opening according to the current opening, the evaporation superheat degree opening correction value, and the exhaust opening correction value.

14. The multi-tube air conditioner of claim 12, wherein the program further causes the processor to:

in response to that the exhaust correction direction of the target indoor unit is inconsistent with the evaporation superheat degree correction direction, determine whether an exhaust correction direction of the target indoor unit is consistent with an evaporation superheat degree correction direction when the multi-tube air conditioner entered the target operation state last time;

in response to that the exhaust correction direction is consistent with the evaporation superheat degree correction direction when the multi-tube air conditioner entered the target operation state last time, determine a current opening of the electronic expansion valve of the target indoor unit; and determine the target opening of the electronic expansion valve of the target indoor unit according to the current opening, the evaporation superheat degree opening correction value of the target indoor unit, and the exhaust opening correction value.

15. The multi-tube air conditioner of claim 10, wherein the program further causes the processor to:

determine an exhaust deviation value according to the exhaust temperature and a target exhaust temperature;

determine an exhaust opening correction value according to the exhaust deviation value;

determine whether the exhaust deviation value is less than a preset exhaust deviation value;

in response to that the exhaust deviation value is greater than or equal to the preset exhaust deviation value, determine a current opening of the electronic expansion valve;

determine the target opening according to the current opening and the exhaust opening correction value.

16. The multi-tube air conditioner of claim 10, wherein:

the target indoor unit is one of one or more indoor units of the multi-tube air conditioner; and the program further causes the processor to, before acquiring the exhaust temperature of the compressor of the multi-tube air conditioner and the evaporation temperature of the target indoor unit:

in response to detecting that an operation state of at least one of the one or more indoor units of the multi-tube air conditioner changes, determine a cooling capacity ratio corresponding to a target shutdown indoor unit, the target shutdown indoor unit being one of the one or more indoor units that is to switch from an on state to an off state;

in response to that the cooling capacity ratio corresponding to the target shutdown indoor unit is greater than or equal to a preset cooling capacity ratio, control an indoor fan of the target shutdown indoor unit to stop running, and close an electronic expansion valve of the target shutdown indoor unit after a preset time; and in response to that the cooling capacity ratio corresponding to the target shutdown indoor unit is less than the preset cooling capacity ratio, control the indoor fan of the target shutdown indoor unit to stop running and close the electronic expansion valve of the target shutdown indoor unit.

* * * * *